US010902127B2

(12) United States Patent
Venkataraman et al.

(10) Patent No.: US 10,902,127 B2
(45) Date of Patent: Jan. 26, 2021

(54) METHOD AND APPARATUS FOR SECURE BOOT OF EMBEDDED DEVICE

(71) Applicant: American Megatrends International, LLC, Duluth, GA (US)

(72) Inventors: Aruna Venkataraman, Duluth, GA (US); Ryan McCutcheon, Atlanta, GA (US); Satheesh Thomas, Dunwoody, GA (US); Valantina Arumugam, Chennai (IN); Hemanthkumar M, Hyderabad (IN); Venkatesan Balakrishan, Chennai (IN); Anurag Bhatia, Lilburn, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 99 days.

(21) Appl. No.: 16/210,300

(22) Filed: Dec. 5, 2018

(65) Prior Publication Data

US 2020/0184077 A1 Jun. 11, 2020

(51) Int. Cl.
| | |
|---|---|
| G06F 21/57 | (2013.01) |
| G06F 9/4401 | (2018.01) |
| H04L 9/30 | (2006.01) |
| G06F 21/64 | (2013.01) |
| H04L 9/32 | (2006.01) |

(52) U.S. Cl.
CPC .......... *G06F 21/575* (2013.01); *G06F 9/4401* (2013.01); *G06F 21/64* (2013.01); *H04L 9/30* (2013.01); *H04L 9/3247* (2013.01); *G06F 2221/034* (2013.01)

(58) Field of Classification Search
CPC ..... H04L 9/3247; G06F 21/575; G06F 9/4401
USPC ............... 726/1, 12, 16, 22; 713/2, 168, 176
See application file for complete search history.

(56) References Cited

U.S. PATENT DOCUMENTS

| | | | |
|---|---|---|---|
| 10,162,543 B1* | 12/2018 | Patel | ................... G06F 9/4418 |
| 2008/0141017 A1* | 6/2008 | McCoull | ................ G07F 17/32 |
| | | | 713/2 |

(Continued)

OTHER PUBLICATIONS

"Second Stage Boot Loader V. 1.4"—Hilscher, Oct. 2014 https://kb.hilscher.com/display/SSBL/Second+Stage+Boot+Loader (Year: 2014).*

*Primary Examiner* — Randy A Scott
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus is an embedded-system device. The embedded-system device loads a first boot loader from a read only section of a storage device in an initialization process of the embedded-system device. The embedded-system device also loads, by the first boot loader, a public key from the read only section. The embedded-system device further generates a first verification code for static code and data stored in a first section of the storage device. The embedded-system device then decrypts, by the first boot loader, an encrypted signature stored in the first section by using the public key to obtain a second verification code. The embedded-system device determines integrity of the static code and data based on the first verification code and the second verification code.

14 Claims, 4 Drawing Sheets

(56) References Cited

U.S. PATENT DOCUMENTS

2015/0113278 A1\* 4/2015 Cocchi .............. H04W 12/0023
    713/171
2019/0349202 A1\* 11/2019 Ling .................... H04L 9/3247

\* cited by examiner

METHOD AND APPARATUS FOR SECURE BOOT OF EMBEDDED DEVICE

BACKGROUND

Field

The present disclosure relates generally to computer systems, and more particularly, to techniques of determining integrity of baseboard management controller (BMC) firmware prior to booting.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

There is a need for a mechanism that can establish the embedded device firmware as trusted and secure.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is an embedded-system device. The embedded-system device loads a first boot loader from a read only section of a storage device in an initialization process of the embedded-system device. The embedded-system device also loads, by the first boot loader, a public key from the read only section. The embedded-system device further generates a first verification code for static code and data stored in a first section of the storage device. The embedded-system device then decrypts, by the first boot loader, an encrypted signature stored in the first section by using the public key to obtain a second verification code. The embedded-system device determines integrity of the static code and data based on the first verification code and the second verification code.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
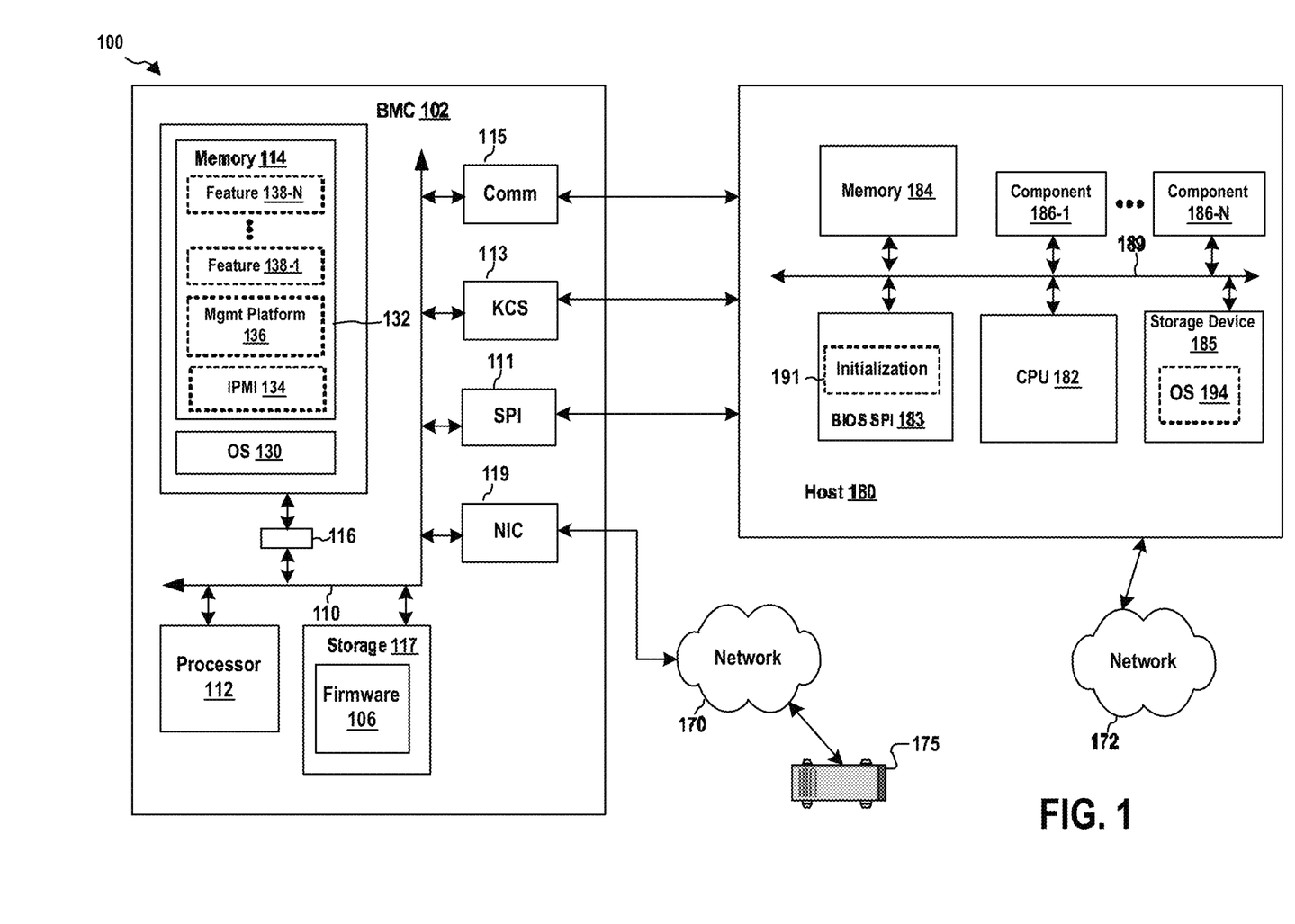
FIG. 1 is a diagram illustrating a computer system.

FIG. 1 is a diagram illustrating a computer system 100. In this example, the computer system includes, among other devices, a BMC 102 and a host computer 180. The BMC 102 has, among other components, a processing unit 112, a memory 114, a memory driver 116, a storage device 117, a SPI interface 111 (Serial Peripheral Interface), a KCS interface 113 (Keyboard Controller Style), a network interface card 119, and other communication interfaces 115.

The communication interfaces 115 may include a Universal Serial Bus (USB) interface, a server management interface chip (SMIC) interface, a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the KCS interface 113, the network interface card 119, and the communication interfaces 115.

In certain configurations, one or more of the above components may be implemented as a system-on-a-chip (SoC). For examples, the processing unit 112, the memory 114, the memory driver 116, the storage device 117, the network interface card 119, the KCS interface 113, the SPI interface 111, and/or the communication interfaces 115 may be on the same chip. In addition, those components may be in communication with each other through a communication channel 110 such as a bus architecture.

The BMC 102 may store BMC firmware 106 in the storage device 117. The storage device 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 include, among other components, IPMI services 134, a management platform 136, and feature components 138-1 to 138-N. Further, the service components 132 may be implemented as a service stack. As such, the BMC firmware 106 can provide an embedded system to the BMC 102. In addition, the storage device 117 may provide database(s) 107 that can be accessed by the IPMI services 134 or the management platform 136.

In one example, the management platform 136 may implements REDFISH specification, as defined in "Redfish Scalable Platforms Management API Specification Document Identifier: DSP0266 Date: 2018 Apr. 5 Version: 1.4.1," which is published by Distributed Management Task Force (DMTF) and is expressly incorporated by reference herein in its entirety.

The BMC 102 may be in communication with the host computer 180 through the KCS interface 113, the network interface card 119, the communication interfaces 115, the SPI interface 111, and/or the IPMI interface.

The host computer 180 includes a host CPU 182, a host memory 184, a storage device 185, an initialization storage device 183, and component devices 186-1 to 186-N that may be interconnected with each other through a host bus system 189. Further, the initialization storage device 183 may be a SPI device.

The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 402 shown in FIG. 4.

In this example, after the host computer 180 is powered on, the host CPU 182 loads an initialization component 191 from the initialization storage device 183 into the host memory 184 and executes the initialization component 191. In one example, the initialization component 191 is a basic input/output system (BIOS). In another example, the initialization component 191 implements a Unified Extensible Firmware Interface (UEFI). UEFI is defined in, for example, "Unified Extensible Firmware Interface Specification Version 2.6, dated January, 2016," which is expressly incorporated by reference herein in their entirety. As such, the initialization component 191 may include one or more UEFI boot services.

The initialization component 191, among other things, performs hardware initialization during the booting process (power-on startup). For example, when the initialization component 191 is a BIOS, the initialization component 191 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 191 then initializes the device on which it is located. When the initialization component 191 includes UEFI boot services, the initialization component 191 may also perform procedures similar to POST.

After the initialization is performed, the initialization component 191 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Each of the feature components 138-1 to 138-N, alone or in combination with the IPMI services 134 and/or the management platform 136, may provide a particular functionality. The functionality may be for managing the components of the host computer 180. For example, the feature component 138-1 may update the firmware of the initialization storage device 183.

Figure 2:
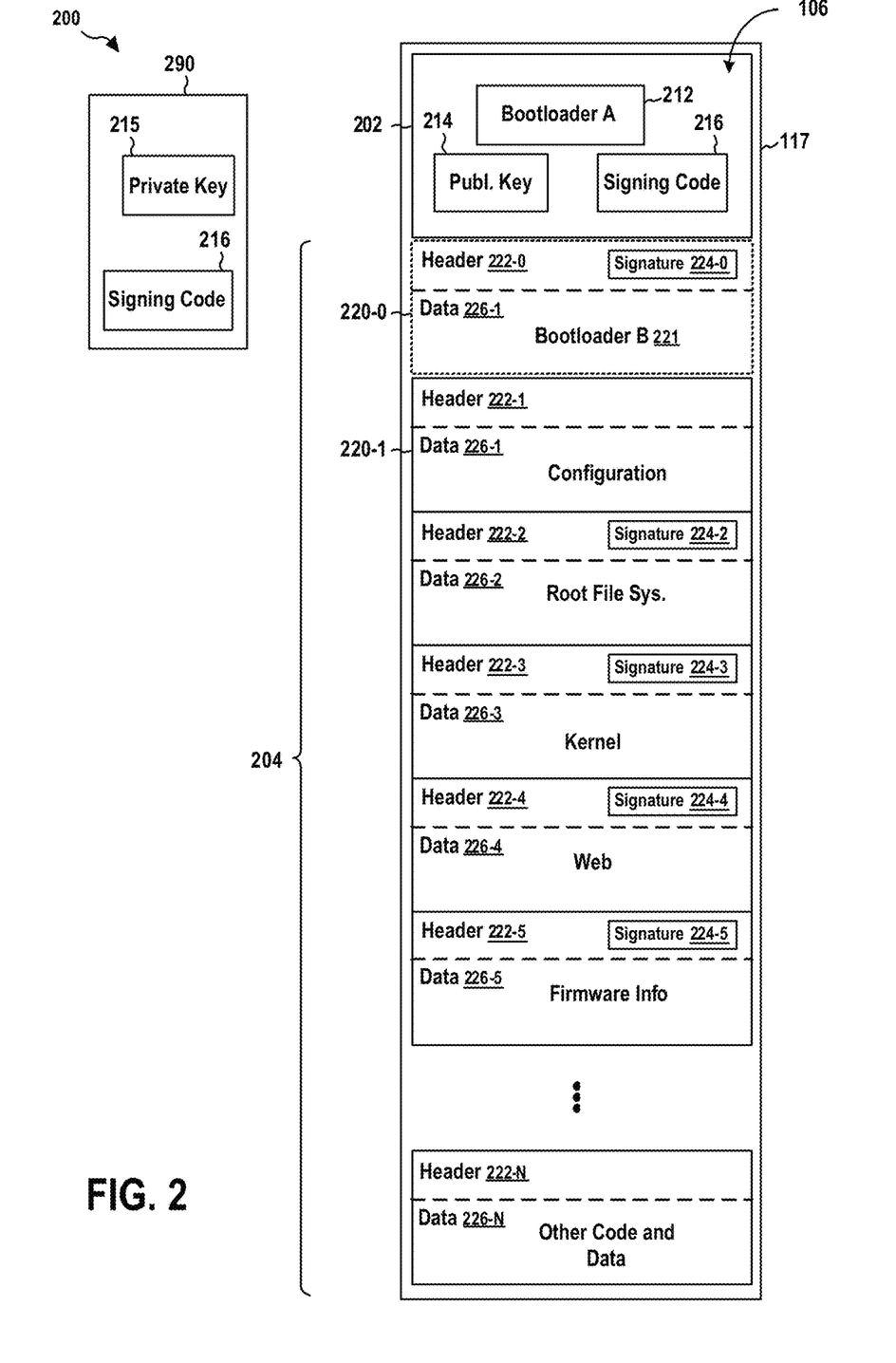
FIG. 2 is a diagram configurations of BMC firmware.

FIG. 2 is a diagram 200 illustrating configurations of the BMC firmware 106. In this example, a generator 290 generates the BMC firmware 106 to be stored in the storage device 117 of the BMC 102. In particular, the storage device 117 may be a SPI device. The storage device 117 has a one-time programmable region 202 and a multiple-time programmable region 204. The BMC firmware 106 includes a boot loader A 212, a public key 214, and signing code 216, which are written into the one-time programmable region 202. As the one-time programmable region 202 can be only programmed once, upon written into the one-time programmable region 202, the boot loader A 212, the public key 214, and the signing code 216 cannot be changed.

In a first configuration, the BMC firmware 106 further includes sections 220-1 to 220-N. Further, the sections 220-1 to 220-N are divided into header parts 222-1 to 222-N (e.g., Flash Module Header) and data parts 226-1 to 226-N, respectively. The data parts 226-1 to 226-N contain various code and data for providing different functionalities. The header parts 222-1 to 222-N contains information, such as size and content, regarding the code and data stored in the corresponding data parts.

Further, some of the sections 220-1 to 220-N may be used to store static code and data and some of the sections 220-1 to 220-N may be used to store dynamic code and data. In this example, the section 220-1 stores configuration data, which is dynamic. The section 220-2 to 220-5 store static code and data of a root file system, a kernel, a web service, and firmware information, respectively.

The code and data in the section 220-2 to 220-5 are static, i.e., do not change during execution of the BMC firmware 106. To protect the integrity of the static code and data, when the BMC firmware 106 is generated, a generator 290 of the BMC firmware 106 can calculate encrypted signatures 224-2 to 224-5 for the code and data in the data parts 226-2 to 226-5. More specifically, signing code 216 of the generator 290 can use a particular hash algorithm to calculate hash codes for the data parts 226-2 to 226-5, respectively. Further, the generator 290 can use a private key 215 to encrypt the hash codes, thus generating encrypted signatures 224-2 to 224-5 for code and data in the data parts 226-2 to 226-5, respectively. Subsequently, the generator 290 stores the encrypted signatures 224-2 to 224-5 in the header parts 222-2 to 222-5, respectively. The private key 215 and the public key 214 are a pair. Therefore, data encrypted by using the private key 215 can be decrypted by using the public key 214.

The code and data in the section 220-1 are dynamic data and are changed during execution of the BMC firmware 106. Accordingly, the generator 290 does not generate an encrypted signature for those code and data.

The section 220-1 to 220-N are stored in the multiple-time programmable region 204 of the storage device 117. As such, the BMC firmware 106 is installed on the BMC 102.

In this first configuration, as described infra, the boot loader A 212 is configured to use the public key 214 to and the signing code 216 to verify the hash codes provided by the encrypted signatures 224-2 to 224-5 stored in the header parts 222-2 to 222-5.

When the BMC 102 is power on or reset, the processing unit 112 initially load the boot loader A 212 into the memory 114. The boot loader A 212, prior to loading code and data stored in the sections 220-1 to 220-N, first checks the integrity of the static code and data stored in the section 220-2 to 220-5. In particular, after the boot loader A 212 detects that the encrypted signatures 224-2 to 224-5 are stored in the header parts 222-2 to 222-5, the boot loader A 212 employs the signing code 216 to calculate hash codes of the code and data stored in the data parts 226-2 to 226-5, respectively. Therefore, the boot loader A 212 generates a respective calculated hash code for each of the data parts 226-2 to 226-5.

Further, the boot loader A 212, employing the public key 214, decrypts the encrypted signatures 224-2 to 224-5 to obtain stored hash codes for the data parts 226-2 to 226-5, respectively.

The boot loader A 212 then compares the calculated hash codes with the stored hash codes of the data parts 226-2 to 226-5. When the respective calculated hash code matches the respective stored hash code of each of the data parts 226-2 to 226-5, the boot loader A 212 determines that the integrity of the data parts 226-2 to 226-5 is intact. The boot loader A 212 can proceed with loading each of the sections 220-1 to 220-N.

When the respective calculated hash code does not match the respective stored hash code for any one of the data parts 226-2 to 226-5, the boot loader A 212 determines that the integrity of the data parts 226-2 to 226-5 is tampered. The boot loader A 212 then aborts the booting process. The boot loader A 212 can display error messages indicating the data part(s) that have been tampered on a display utilized by the BMC 102.

In a second configuration, in addition to the sections 220-1 to 220-N, the BMC firmware 106 also includes a section 220-0. As such, the sections 220-0 to 220-N are stored in the multiple-time programmable region 204. The section 220-0 contains a boot loader B 221, which is static. Similar to what was described supra, when generating the BMC firmware 106, the generator 290 calculates a hash code and a corresponding encrypted signature 224-0 for the data part 226-0. The encrypted signature 224-0 is stored in the header parts 222-0. The boot loader B 221, in this configuration, loads the code and data stored in the sections 220-1 to 220-N. The boot loader A 212, stored in the one-time programmable region 202, is a small footprint loader which verifies the integrity of the sections 220-0 to 220-N and loads the boot loader B 221 when the integrity is intact.

When the BMC 102 is power on or reset, the processing unit 112 initially load the boot loader A 212 into the memory 114. The boot loader A 212, prior to loading the boot loader B 221, first checks the integrity of the static code and data stored in the section 220-0 and the section 220-2 to 220-5. In particular, after the boot loader A 212 detects that the encrypted signature 224-0 and the encrypted signatures 224-2 to 224-5 are stored in the header parts 222-0 and the header parts 222-2 to 222-5, the boot loader A 212 employs the signing code 216 to calculate hash codes of the code and data stored in the data part 226-0 and the data parts 226-2 to 226-5, respectively. Therefore, the boot loader A 212 generates a respective calculated hash code for each of the data part 226-0 and the data parts 226-2 to 226-5.

Further, the boot loader A 212, employing the public key 214, decrypts the encrypted signature 224-0 and the encrypted signatures 224-2 to 224-5 to obtain stored hash codes for the data part 226-0 and the data parts 226-2 to 226-5, respectively.

The boot loader A 212 then compares the calculated hash codes with the stored hash codes of the data parts 226-0, 226-2 to 226-5. When the respective calculated hash code matches the respective stored hash code of each of the data parts 226-0, 226-2 to 226-5, the boot loader A 212 determines that the integrity of the data parts 226-0, 226-2 to 226-5 is intact. The boot loader A 212 can proceed with the boot loader B 221. Once running, the boot loader B 221 loads each of the sections 220-1 to 220-N.

When the respective calculated hash code does not match the respective stored hash code for any one of the data parts 226-0, 226-2 to 226-5, the boot loader A 212 determines that the integrity of the data parts 226-0, 226-2 to 226-5 is tampered. The boot loader A 212 then aborts the booting process. The boot loader A 212 can display error messages indicating the data part(s) that have been tampered on a display utilized by the BMC 102.

In the first and second configurations, when generating the BMC firmware 106, the generator 290 generates an encrypted signature for each of the data parts 226-1 to 226-N having static code and data separately.

In a third configuration, instead of generating separate encrypted signatures, the generator 290 may generate a single encrypted signature for all the static data parts collectively. As such, the boot loader A 212 verifies the single encrypted signature for all the static data parts collectively during the booting process.

Figure 3:
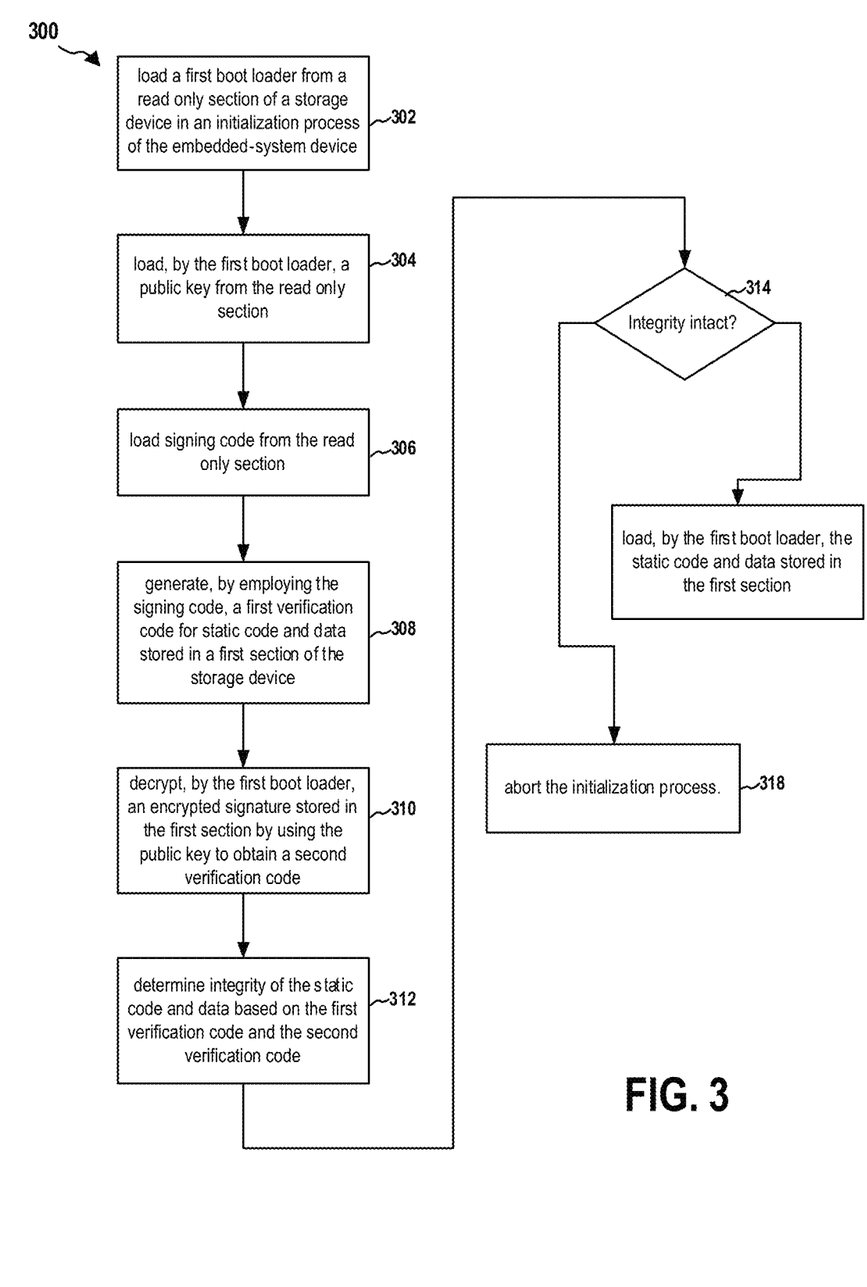
FIG. 3 is a flow chart of a method (process) for booting.

FIG. 3 is a flow chart 300 of a method (process) for booting. The method may be performed by an embedded-system device (e.g., the BMC 102). At operation 302, the embedded-system device loads a first boot loader (e.g., the boot loader A 212) from a read only section (e.g., the one-time programmable region 202) of a storage device (e.g., the storage device 117) in an initialization process of the embedded-system device. At operation 304, the embedded-system device loads, by the first boot loader, a public key (e.g., the public key 214) from the read only section. At operation 306, the embedded-system device loads signing code (e.g., the signing code 216) from the read only section.

At operation 308, the embedded-system device generates, employing the signing code, a first verification code (e.g., the calculated hash code) for static code and data stored in a first section (e.g., the section 220-0 or the section 220-2) of the storage device. At operation 310, the embedded-system device decrypts, by the first boot loader, an encrypted signature (e.g., the encrypted signature 224-0 or the encrypted signature 224-2) stored in the first section by using the public key to obtain a second verification code (e.g., the stored hash code).

At operation 312, the embedded-system device determines integrity of the static code and data based on the first verification code and the second verification code. At operation 314, the embedded-system device determines whether the integrity is intact. In certain configurations, the integrity of the static code and data is determined to be intact when the first verification code matches the second verification code, When the integrity is intact, the embedded-system device, at operation 316, loads, by the first boot loader, the static code and data stored in the first section. In certain configurations, the integrity of the static code and data is determined to be tampered when the first verification code does not match the second verification code. When the integrity is tampered, the embedded-system device, at operation 318, aborts the initialization process.

In certain configurations, the static code and data in the first section (e.g., the section 220-0) constitute a second boot loader (e.g., the boot loader B 221). In certain configurations, the first section includes a header part (e.g., one of the header parts 222-2 to 222-5) and a data part (e.g., one of the data parts 226-2 to 226-5). The encrypted signature is stored in the header part.

In certain configurations, the embedded-system device further generates a respective calculated verification code for code and data stored in each of one or more additional sections (e.g., the section 220-2 to 220-5) of the storage device. The embedded-system device decrypts, by the first boot loader, a respective encrypted signature stored in the each additional section by using the public key to obtain a respective stored verification code. The embedded-system device determines whether integrity of code and data stored in the each section is intact based on whether the respective calculated verification code matches the respective stored verification code.

The embedded-system device loads the static code and data stored in each of the one or more additional sections when integrity of all of the one or more additional sections is intact. The embedded-system device aborts the initialization process when integrity of any of the one or more additional sections is tampered.

In certain configurations, the first section is divided into a plurality of sub-sections each including a data part storing code and data for a respective functionality and a header part. The code and data stored in the first section include header parts and data parts of all of the plurality of sub-sections.

Figure 4:
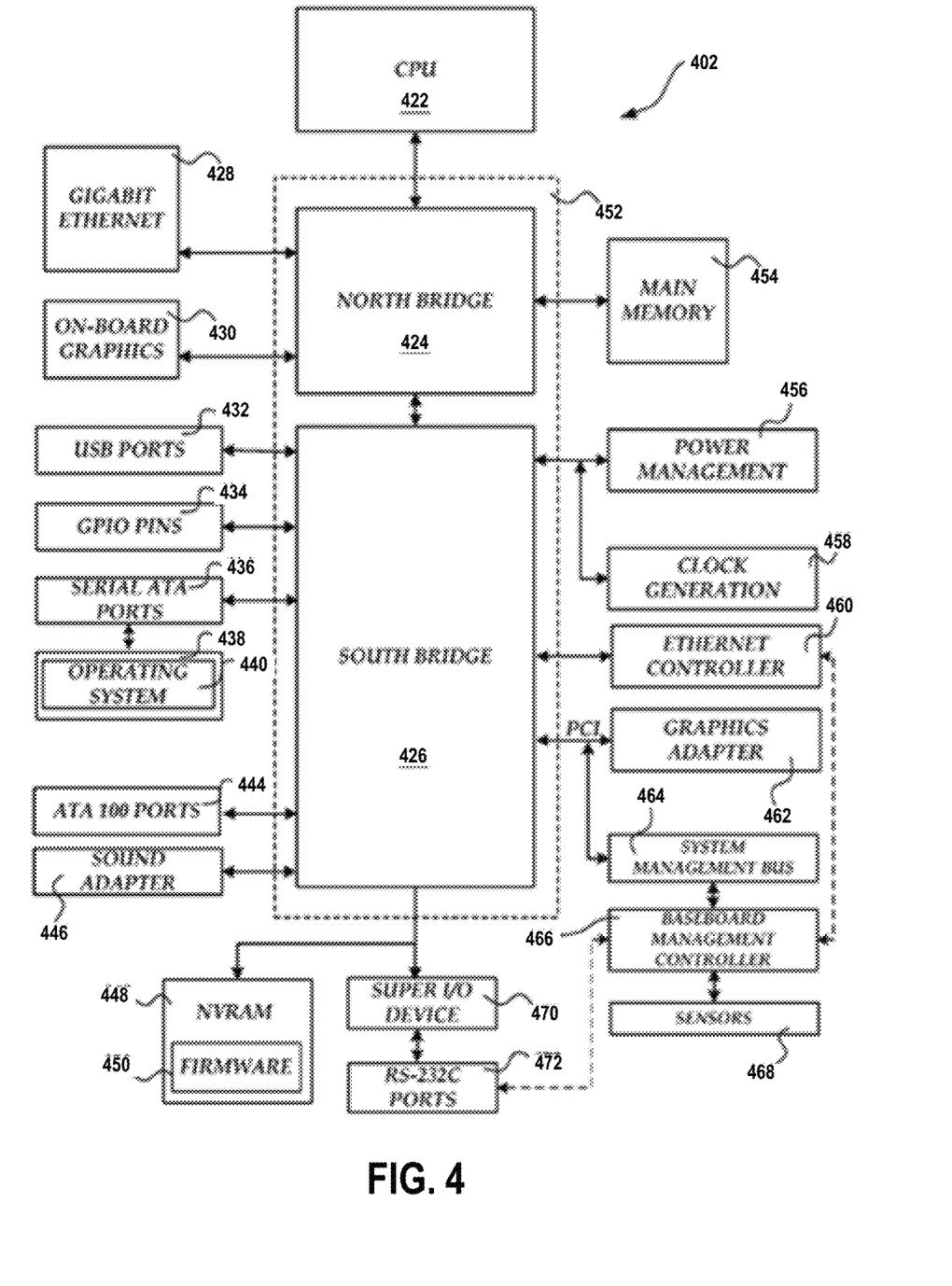
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 180, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including handheld computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of utilizing an embedded-system device, comprising:
    loading, on a processor of the embedded-system device, a first boot loader from a read only section of a storage device in an initialization process of the embedded-system device;
    loading, by the first boot loader, a public key from the read only section;
    generating a first calculated verification code for first static code and data stored in a first section of a plurality of sections in a multiple-time programmable region of the storage device, wherein the first static code and data in the first section constitute a second boot loader;
    decrypting, by the first boot loader, a first encrypted signature stored in the first section by using the public key to obtain a first stored verification code;
    determining integrity of the first static code and data in the first section based on the first calculated verification code and the first stored verification code;
    generating, by the first boot loader, a respective additional calculated verification code for additional code and data stored in each of one or more additional sections of the plurality of sections other than the first section in the multiple-time programmable region;
    decrypting, by the first boot loader, a respective additional encrypted signature stored in each of the one or more additional sections by using the public key to obtain a respective additional stored verification code; and
    determining, by the first boot loader, whether integrity of the additional code and data stored in each of the one or more additional sections is verified based on whether the respective additional calculated verification code matches the respective additional stored verification code;
    loading, by the first boot loader, the second boot loader when the integrity of the first static code and data in the first section is verified; and
    loading, by the second boot loader, the additional code and data stored in each of the one or more additional sections when the integrity of the additional code and data stored in each of the one or more additional sections is verified.

2. The method of claim 1, further comprising:
    loading signing code from the read only section, wherein the first calculated verification code is generated by employing the signing code.

3. The method of claim 1, wherein the integrity of the first static code and data is determined to be verified when the first calculated verification code matches the first stored verification code.

4. The method of claim 1, wherein the integrity of the first static code and data is determined to be tampered when the first calculated verification code does not match the first stored verification code, the method further comprising:
    aborting the initialization process.

5. The method of claim 1, wherein the first section includes a header part and a data part, wherein the first encrypted signature is stored in the header part.

6. The method of claim 1, further comprising:
aborting the initialization process when integrity of any of the one or more additional sections is tampered.

7. The method of claim 1, wherein the first section is divided into a plurality of sub-sections each including a data part storing code and data for a respective functionality and a header part, wherein the code and data stored in the first section include header parts and data parts of all of the plurality of sub-sections.

8. An apparatus, the apparatus being an embedded-system device, comprising:
a memory; and
at least one processor coupled to the memory and configured to:
load a first boot loader from a read only section of a storage device in an initialization process of the embedded-system device;
load, by the first boot loader, a public key from the read only section;
generate a first calculated verification code for first static code and data stored in a first section of a plurality of sections in a multiple-time programmable region of the storage device, wherein the first static code and data in the first section constitute a second boot loader;
decrypt, by the first boot loader, a first encrypted signature stored in the first section by using the public key to obtain a first stored verification code;
determine integrity of the first static code and data in the first section based on the first calculated verification code and the first stored verification code;
generate, by the first boot loader, a respective additional calculated verification code for additional code and data stored in each of one or more additional sections of the plurality of sections other than the first section in the multiple-time programmable region;
decrypt, by the first boot loader, a respective additional encrypted signature stored in each of the one or more additional sections by using the public key to obtain a respective additional stored verification code; and
determine, by the first boot loader, whether integrity of the additional code and data stored in each of the one or more additional sections is verified based on whether the respective additional calculated verification code matches the respective additional stored verification code;
load, by the first boot loader, the second boot loader when the integrity of the first static code and data in the first section is verified; and
load, by the second boot loader, the additional code and data stored in each of the one or more additional sections when the integrity of the additional code and data stored in each of the one or more additional sections is verified.

9. The apparatus of claim 8, wherein the at least one processor is further configured to:
load signing code from the read only section, wherein the first calculated verification code is generated by employing the signing code.

10. The apparatus of claim 8, wherein the integrity of the first static code and data is determined to be verified when the first calculated verification code matches the first stored verification code.

11. The apparatus of claim 8, wherein the integrity of the first static code and data is determined to be tampered when the first calculated verification code does not match the first stored verification code, wherein the at least one processor is further configured to:
abort the initialization process.

12. The apparatus of claim 8, wherein the first section includes a header part and a data part, wherein the first encrypted signature is stored in the header part.

13. The apparatus of claim 8, wherein the at least one processor is further configured to:
abort the initialization process when integrity of any of the one or more additional sections is tampered.

14. A non-transitory computer-readable medium storing computer executable code for operating an embedded-system device, comprising code to:
load, on a processor of the embedded-system device, a first boot loader from a read only section of a storage device in an initialization process of the embedded-system device;
load, by the first boot loader, a public key from the read only section;
generate a first calculated verification code for first static code and data stored in a first section of a plurality of sections in a multiple-time programmable region of the storage device, wherein the first static code and data in the first section constitute a second boot loader;
decrypt, by the first boot loader, a first encrypted signature stored in the first section by using the public key to obtain a first stored verification code;
determine integrity of the first static code and data in the first section based on the first calculated verification code and the first stored verification code;
generate, by the first boot loader, a respective additional calculated verification code for additional code and data stored in each of one or more additional sections of the plurality of sections other than the first section in the multiple-time programmable region;
decrypt, by the first boot loader, a respective additional encrypted signature stored in each of the one or more additional sections by using the public key to obtain a respective additional stored verification code; and
determine, by the first boot loader, whether integrity of the additional code and data stored in each of the one or more additional sections is verified based on whether the respective additional calculated verification code matches the respective additional stored verification code;
load, by the first boot loader, the second boot loader when the integrity of the first static code and data in the first section is verified; and
load, by the second boot loader, the additional code and data stored in each of the one or more additional sections when the integrity of the additional code and data stored in each of the one or more additional sections is verified.

* * * * *